(12) United States Patent
Schwarz, Jr. et al.

(10) Patent No.: US 12,148,025 B1
(45) Date of Patent: *Nov. 19, 2024

(54) SYSTEMS AND METHODS FOR ASSET SHARING USING DISTRIBUTED LEDGER TECHNIQUES

(71) Applicant: United Services Automobile Association (USAA), San Antonio, TX (US)

(72) Inventors: Thomas Wayne Schwarz, Jr., Helotes, TX (US); Snehal Desai, Richardson, TX (US); Nolan Serrao, Plano, TX (US); Jeanie Graciela Lopez, San Antonio, TX (US); Jennifer Hunt Erickson, San Antonio, TX (US); Bharat Prasad, San Antonio, TX (US); Yevgeniy Viatcheslavovich Khmelev, San Antonio, TX (US); Joel S. Hartshorn, Liberty Lake, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,880

(22) Filed: Oct. 12, 2023

Related U.S. Application Data

(63) Continuation of application No. 16/795,297, filed on Feb. 19, 2020, now Pat. No. 11,810,183.

(Continued)

(51) Int. Cl.
*G06Q 30/0645* (2023.01)
*G06F 16/27* (2019.01)

(52) U.S. Cl.
CPC ......... *G06Q 30/0645* (2013.01); *G06F 16/27* (2019.01)

(58) Field of Classification Search
None
See application file for complete search history.

(56) References Cited

U.S. PATENT DOCUMENTS

| 5,729,594 | A | 3/1998 | Klingman |
|---|---|---|---|
| 7,050,997 | B1 | 5/2006 | Wood, Jr. |

(Continued)

OTHER PUBLICATIONS

"Opportunities and Use Cases for Distributed Ledger Technologies in IoT", GSMA, published 2018 (Year: 2018).*

(Continued)

*Primary Examiner* — Richard W. Crandall
(74) *Attorney, Agent, or Firm* — Fletcher Yoder P.C.

(57) ABSTRACT

Systems and methods described herein facilitate the tracking of shared ownership of assets, such as real property as well as other types of property, using distributed ledger technology (DLT) techniques. For example, in timesharing scenarios, by storing data relating to shared ownership of particular assets in a distributed ledger, such as a blockchain, various aspects of the shared ownership of the shared asset may be tracked in an immutable and secure manner with all parties involved having transparency into the data relating to the shared asset. For example, the embodiments described herein enable tracking of certain aspects relating to shared ownership of a shared asset, such as scheduling of time periods during which certain share owners may take custody, tracking of transfers of custody of the shared asset between share owners, transfer of control of smart devices associated with the shared asset, and so forth.

17 Claims, 7 Drawing Sheets

Related U.S. Application Data

(60) Provisional application No. 62/807,601, filed on Feb. 19, 2019.

(56) References Cited

U.S. PATENT DOCUMENTS

| | | | |
|---|---|---|---|
| 7,933,787 | B1 | 4/2011 | Betz, III et al. |
| 9,355,423 | B1 | 5/2016 | Slusar |
| 10,383,170 | B2 | 8/2019 | Deros et al. |
| 10,447,786 | B1 * | 10/2019 | Arnberg ............... H04W 12/35 |
| 11,074,558 | B1 | 7/2021 | Johnstone et al. |
| 2004/0024912 | A1 | 2/2004 | Fukao et al. |
| 2004/0169722 | A1 | 9/2004 | Pena |
| 2005/0177488 | A1 | 8/2005 | Rexrode |
| 2005/0251446 | A1 | 11/2005 | Jiang et al. |
| 2005/0273387 | A1 | 12/2005 | Previdi |
| 2006/0025132 | A1 * | 2/2006 | Karaoguz ......... H04M 1/72502 |
| | | | 455/433 |
| 2008/0249829 | A1 | 10/2008 | Vicino |
| 2008/0263058 | A1 | 10/2008 | Peden |
| 2009/0063228 | A1 | 3/2009 | Forbes, Jr. |
| 2009/0083137 | A1 | 3/2009 | Tsai et al. |
| 2010/0191589 | A1 | 7/2010 | Matte |
| 2011/0015802 | A1 | 1/2011 | Imes |
| 2011/0264278 | A1 | 10/2011 | Gilbert et al. |
| 2011/0288905 | A1 | 11/2011 | Mrakas |
| 2012/0290486 | A1 | 11/2012 | Dobrowolski et al. |
| 2013/0035992 | A1 | 2/2013 | Silverman |
| 2013/0080323 | A1 | 3/2013 | Scipioni |
| 2013/0229259 | A1 | 9/2013 | Huang |
| 2013/0254009 | A1 | 9/2013 | Barr |
| 2014/0019319 | A1 | 1/2014 | Derby et al. |
| 2014/0136242 | A1 | 5/2014 | Weekes et al. |
| 2014/0163759 | A1 | 6/2014 | Anderson et al. |
| 2014/0377720 | A1 | 12/2014 | Felix |
| 2015/0235333 | A1 | 8/2015 | Bangerter et al. |
| 2015/0276239 | A1 | 10/2015 | Fadell et al. |
| 2015/0332215 | A1 | 11/2015 | Wilson et al. |
| 2016/0086285 | A1 | 3/2016 | Jordan Peters et al. |
| 2016/0234213 | A1 | 8/2016 | Kim et al. |
| 2016/0327921 | A1 | 11/2016 | Ribbich et al. |
| 2017/0221150 | A1 | 8/2017 | Bichacho |
| 2018/0343252 | A1 | 11/2018 | Evesti et al. |
| 2019/0319960 | A1 | 10/2019 | Shen et al. |
| 2021/0224934 | A1 | 7/2021 | Williams et al. |

OTHER PUBLICATIONS

Petcu, Paula, "Making Your Smart Home Airbnb Ready," MonoHelix Labs Blog. [online], published on Jan. 30, 2017, available at: <http://www.monohelixlabs.com/making-smart-home-airbnb-ready.html>.

Ravenscraft, "How to make your smart home tech guest friendly," Reviewgeek.com [online], archived on Aug. 27, 2018, available on Wayback machine at: <https://web.archive.org/web/201801000000*/https://www.reivewgeek.com/6506/how-to-make-your-smart-home-tech-guest-friendly/> (Year: 2018).

Tapscott, Alex, "The Internet of Things needs a Ledger of Things," [online], Forbes.com, available at: <https://www.forbes.com/sites/alextapscott/2016/08/08/the-internet-or-things-needs-a-ledger-of-things/?sh=1cfdec3240d1>, published Aug. 8, 2016. (Year: 2016).

* cited by examiner

WELCOME PURCHASER CHRIS BUYER

YOUR PURCHASED ASSETS:
1. 123 MAIN STREET, EXAMPLE, CA 00000
   SHARES OWNED: 10
   CURRENT SHARE PRICE: $2000
2. 978 OAK AVENUE, PEERO, IN 99999
   SHARES OWNED: 20
   CURRENT SHARE PRICE: $800
...

ASSETS WITH SHARES AVAILABLE FOR PURCHASE:
1. 12456 E 7TH STREET, EXAMPLE, CA 00001
   ASSET TYPE: SINGLE FAMILY HOUSE
   CURRENT SHARE PRICE: $1500
   SHARES AVAILABLE: 500
2. 5212 COMMERCE DR, #5A, ST. PAUL, WI 55555
   ASSET TYPE: CONDOMINIUM UNIT
   CURRENT SHARE PRICE: $600
   SHARES AVAILABLE: 50
...

PURCHASED ASSET DATA 162

AVAILABLE ASSET DATA 164

FIG. 6

SYSTEMS AND METHODS FOR ASSET SHARING USING DISTRIBUTED LEDGER TECHNIQUES

CROSS-REFERENCES TO RELATED APPLICATIONS

The present disclosure is a continuation of U.S. patent application Ser. No. 16/795,297, titled "Systems and Methods for Asset Sharing using Distributed Ledger Techniques," which was filed on Feb. 19, 2020, which is related to, and claims priority to, U.S. Provisional Patent Application Ser. No. 62/807,601, titled "Systems and Methods for Asset Sharing using Distributed Ledger Techniques," which was filed on Feb. 19, 2019, both of which are herein incorporated by reference in their entireties for all purposes.

BACKGROUND

The present disclosure relates generally to asset sharing and, more particularly, to systems and methods for implementing asset sharing using distributed ledger technology (DLT) techniques.

The sharing of ownership of assets, such as real property or other types of property, tends to carry certain obligations relating to the shared ownership, not the least of which is scheduling when certain share owners may be entitled to take custody of the shared asset, tracking when actual transfers of custody take place, and so forth. As such, quite often, the various share owners may often find themselves quibbling over details relating to rights and obligations relating to the shared ownership of the shared asset. More specifically, there is often no shared repository for tracking information relating to the shared ownership of the asset.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include DLT systems, application programming interfaces (APIs), and/or methods for operation thereof that may, for example, implement a smart contract-based infrastructure for storage of historical records relating to a shared asset. In certain embodiments, the smart contract infrastructure may be deployed in a DLT network.

In certain embodiments, a system includes at least one processor and at least one non-transitory computer-readable storage media communicatively coupled to the at least one processor. The at least one non-transitory computer-readable storage media stores instructions which, when executed by the at least one processor, cause the processor to perform operations. The operations include receiving a request to update a first set of data relating to a shared asset stored in a DLT network. The shared asset is shared by a plurality of share owners. The operations also include accessing the DLT network to update the first set of data relating to the shared asset in accordance with the request. The operations further include, upon updating the first set of data relating to the shared asset, providing a second set of data relating to the shared asset.

In certain embodiments, a method performed by at least one processor includes receiving, by the at least one processor, a request to update a first set of data relating to a shared asset stored in a DLT network. The shared asset is shared by a plurality of share owners. The method also includes accessing, by the at least one processor, the DLT network to update the first set of data relating to the shared asset in accordance with the request. The method further includes, upon updating the first set of data relating to the shared asset, providing, by the at least one processor, a second set of data relating to the shared asset.

In certain embodiments, one or more non-transitory computer-readable storage media store instructions which, when executed by a processor, cause at least one processor to perform operations. The operations include receiving a request to update a first set of data relating to a shared asset stored in a DLT network. The shared asset is shared by a plurality of share owners. The operations also include accessing the DLT network to update the first set of data relating to the shared asset in accordance with the request. The operations further include, upon updating the first set of data relating to the shared asset, providing a second set of data relating to the shared asset.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 6 illustrates a share purchaser interface for asset share purchase, in accordance with embodiments described herein;

DETAILED DESCRIPTION

Figure 1:
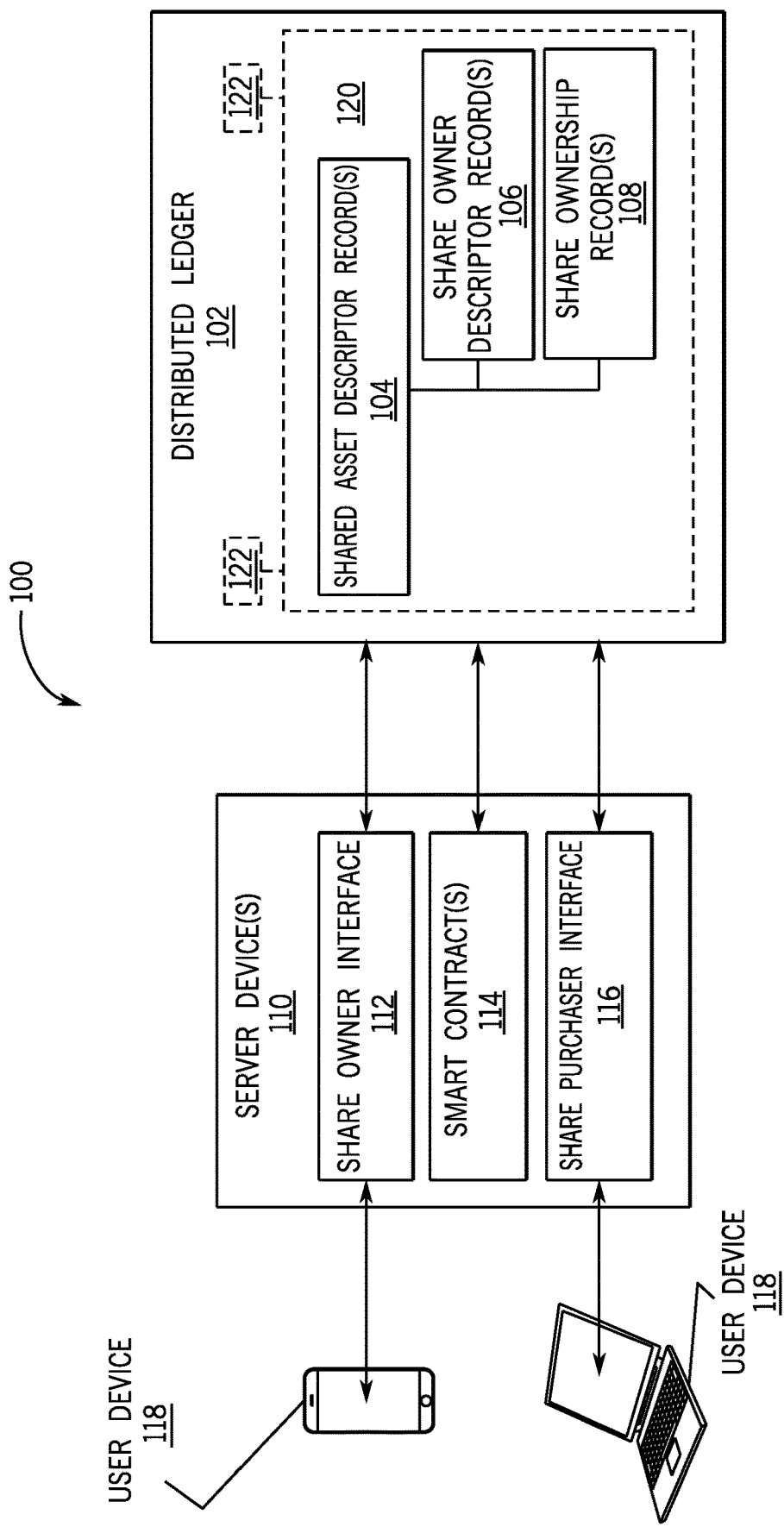
FIG. 1 illustrates a system for shared asset ownership tracking, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems, devices, methods, and computer-readable media for determining and tracking shared ownership interests in an asset using a distributed ledger. Shares in an asset, such as a residence (e.g., a house, an apartment, a townhouse, a condominium, a co-op, and so forth) or a parcel of land, may be offered for sale through an online marketplace. Sales of the shares, and information regarding the shared asset, may be tracked using a distributed ledger, such as a system that includes one or more distributed ledgers. These distributed ledgers provide immutable and secure data storage, which may be distributed across a plurality of computing systems or nodes.

For many individuals, their primary asset and/or investment is their home. The techniques described herein enable original owners to offer shares in their home, which may be used to apportion shared ownership of their home (i.e., the shared asset) to other share owners who buy the shares offered by the original owners. As such, shared ownership of the shared asset may be divided between the various share owners (e.g., the original owner as well as the other owners that buy shares in the shared asset). For example, a percentage of ownership of shares in the shared asset may determine time apportionment between the share owners. As a non-limiting example, if the original owner maintains 50 shares in the asset and offers another 50 shares in the asset to a second share owner, the original owner and the second share owner (e.g., as share owners) would each own 50% of the shared asset. As such, for example, each of the share owners would be entitled to take custody of the shared asset 50% of the time. Furthermore, the techniques described herein enable the share owners to schedule when each of the share owners will be in custody of the shared asset and, indeed, to track custody exchanges between the share owners. Although described herein as relating to shared residential properties, in other embodiments, ownership of other type of shared assets (e.g., assets that are likely to appreciate in value over time), such as artworks, collectible items, antiques, automobiles, other vehicles, and so forth, may be tracked.

Furthermore, the techniques described herein enable shares to be purchased by various investors, including institutional or individual investors. In such circumstances, the shares in the shared asset may not be for the purpose of taking custody of the shared asset, but rather to merely take an ownership interest in the shared asset. For example, in some cases, such as where an individual is military personnel, or otherwise is required to relocate frequently, it may be difficult for the individual to build equity in a home due to transaction costs incurred from the frequent buying and selling of homes. The techniques described herein provide for embodiments by which such individuals can monetize the value in their home without selling the home entirely.

Indeed, certain embodiments provide individuals with liquidity options and/or pricing options for selling shares in their home, allowing individuals to securitize interest in their own equity in the home and pre-sell shares in some of that equity without selling the entire property, and without taking out a loan (e.g., a second mortgage). Previously, barriers to offering such shared ownership in residential assets may have included the costs of offering, selling, and tracking ownership shares. Traditionally, the cost of offering such fractional ownership in a property that is not a commercial property has not made fractional selling worthwhile. The embodiments described herein employ distributed ledger (e.g., blockchain) systems to enable smaller investments in shared ownership of residential properties in a more efficient manner.

A distributed ledger system, such as one or more blockchains, may track the shares of a shared asset that are owned by multiple share owners. The distributed ledger system may also facilitate the securitization and trading of the shares that provide for fractional ownership of the shared asset. The distributed ledger system enables the tracking to be performed more efficiently and inexpensively. The distributed ledger system also provides security, such that only authorized individuals and/or processes can access the data stored on the distributed ledger system. The distributed ledger system also provides immutability, such that data records written to the distributed ledger system may not be changed or removed once written.

As such, the embodiments described herein facilitate the tracking of shared ownership of assets, such as real property as well as other types of property, using DLT techniques. For example, in timesharing scenarios, by storing data relating to shared ownership of particular assets in a distributed ledger, such as a blockchain, various aspects of the shared ownership of the shared asset may be tracked in an immutable and secure manner with all parties involved having transparency into the data relating to the shared asset. For example, the embodiments described herein enable tracking of certain aspects relating to shared ownership of the shared asset, such as scheduling of time periods during which certain share owners may take custody, tracking of transfers of custody of the shared asset between share owners, transfer of control of smart devices associated with the shared asset, and so forth.

FIG. 1 illustrates a system 100 for shared asset ownership tracking, in accordance with embodiments described herein. As shown in the example of FIG. 1, the system 100 may include a distributed ledger 102 that may include one or more blockchains. The distributed ledger 102 may be hosted on any suitable number of computing devices that operate as nodes for the distributed ledger 102. Such nodes may be geographically distributed in any suitable number of locations.

The distributed ledger 102 may store any appropriate number of data records of various types, including shared asset descriptor records 104, share owner descriptor records 106, and share ownership records 108. In certain embodiments, a shared asset descriptor record 104 may include information that describes a particular shared asset. For example, a shared asset descriptor record 104 may include an identification number of a shared asset, an address or other location description of a shared asset (e.g., street address, city, state, country, latitude/longitude coordinates, etc.), a description of the type of shared asset (e.g., a house, an apartment, a townhouse, a condominium, a co-op, and so forth), and so forth. In certain embodiments, a shared asset descriptor record 104 may also describe the total number of shares in the shared asset, the number of shares that are owned by various share owners of the shared asset, the number of outstanding shares that are available for purchase, the current price per share, the current total value of the shared asset (e.g., the current share price multiplied by the total number of shares), deed information, warranty information, property surveys, appraisal information, and/or other ownership information.

In certain embodiments, the shared asset descriptor records 104 may be linked to, or otherwise associated with, one or more share owner descriptor records 106 that describe the share owners (e.g., the initial owner and subsequent additional share owners) of the shared asset described in the linked shared asset descriptor record 104. The share owners may include the individual(s) and/or entity that initially owned the shared asset, and that offers shares in the shared asset for purchase by others. In certain embodiments, the share owner descriptor record 106 may include the name of the share owner, contact information (e.g., address, telephone number, email address, etc.), an identification number, and so forth. In certain embodiments, the share owner descriptor record 106 may also describe the number of shares in the shared asset still held by the share owner, whether available for purchase by others or not, and so forth. In certain embodiments, the share owner descriptor record 106 may also include information regarding the share owner's credit status, outstanding debts, credit rating, cash flow, ability to buy back shares, insurance coverage, and so forth.

In certain embodiments, the shared asset descriptor record 104 may also be linked to one or more share ownership records 108. Each share ownership record 108 may describe ownership of one or more shares by a particular share owner. In certain embodiments, the share ownership record 108 may describe the owner of the shares, the number of shares owned, the price at which the particular shares were purchased, the date and/or time (e.g., time stamp) when the purchase was made, and so forth. In addition, in certain embodiments, each share ownership record 108 may include information relating to certain ownership rights, such as time periods for which the owner of the particular shares may take custody of the shared asset, tracked exchanges of custody of the shared asset, terms of ownership of the shares of the shared asset (e.g., what, specifically, the share owner may actually do with the shared asset while in custody of the shared asset, restrictions on subsequent sales of the shares of the shared asset, including whether the shares may even be sold at all, and so forth), the current price of the shares of the shared asset, and so forth.

One or more server devices 110 may have access to the distributed ledger 102. In certain embodiments, the server device(s) 110 may be nodes that host at least a portion of the distributed ledger 102. Alternatively, the distributed ledger 102 may be hosted on computing device(s) other than the server device(s) 110. The server device(s) 110 may include any suitable number and type of computing devices. In certain embodiments, the server device(s) 110 may execute one or more smart contracts 114 that facilitate tracking of ownership of the shared asset, as described in greater detail herein. In certain embodiments, the server device(s) 110 may provide a share owner interface 112 and a share purchaser interface 116. In certain embodiments, these interfaces 112, 116 may be provided through a same portal (e.g., an application being hosted on the server device(s) 110), with different interfaces 112, 116 accessible to different types of users with different access permissions. In certain embodiments, the interfaces 112, 116 may be web interfaces provided through a web site hosted by the server device(s) 110, and the interfaces 112, 116 may be presented on user devices 118 through web browsers executing on those user devices 118. In certain embodiments, the interface(s) 112, 116 may provide content to be presented through an application executing on the user devices 118.

The user device(s) 118 may include any suitable type of computing devices, including portable computing devices (e.g., smartphone, tablet computer, wearable computer, etc.). In certain embodiments, a share owner of a shared asset may access the share owner interface 112 through a first user device 118, and a subsequent purchaser of shares of the shared asset may access the share purchaser interface 116 through a second user device 118. The share purchaser interface 116 may also be described as a marketplace, or online marketplace, in which potential share purchasers may browse shares that are available for various shared assets.

Use of a distributed ledger 102 (e.g., blockchain system) provides for asset share management and sale that is relatively fast, inexpensive, ubiquitous, secure, and immutable. For example, use of the distributed ledger 102 enables implementations to forego the need for a middleman that may act as a broker of shares and/or act to manage title information and deed records, to register a purchase, to register insurance, to register surveys, and so forth. In certain embodiments, the smart contract(s) 114 may be configured to perform operations to manage the sale and tracking of asset shares, for example, operations that may traditionally be performed for a fee by other individuals (e.g., middlemen).

In certain embodiments, the share owner interface 112 may provide a share owner with real-time, updated information regarding their liquidity in the shared asset, including the number of shares that are currently held by the share owner, the number of shares owned by other share owners, the current price per share, the total value of the asset (based on the share prices and total number of shares), the percentage of the shared asset held by the particular share owner, the percentage of the shared asset owned by other share owners, portfolio value, total economic value, and so forth. Such information may help the share owner make various decisions regarding the shared asset, such as whether to sell the shared asset (and a baseline price to set for the shared asset), to invest in improving the shared asset, to sell more shares in the shared asset, to deal in future sales (e.g., futures contracts), and so forth.

In certain embodiments, the distributed ledger 102 may include a main blockchain 120 and one or more sidechains 122 that are linked to the main blockchain 120. In certain embodiments, the sidechains 122 may store information relating to the shared asset, but be maintained by organizations other than the organization that maintains the main distributed ledger 120, and provide the information relating to the shared asset to the system 100 through the server device(s) 110. For example, one sidechain 122 may be managed by a government agency (e.g., municipality such as a city), and may include information regarding liens, easements, and/or other types of encumbrances that are on the shared asset. Such information may be used to determine the value of a shared asset and/or may be provided to potential purchasers of shares in a shared asset to help inform their purchase. As another example, another sidechain 122 may include tax information, and may be used to levy a share of the taxes on a shared asset to be distributed among share owners in the shared asset.

Figure 2:
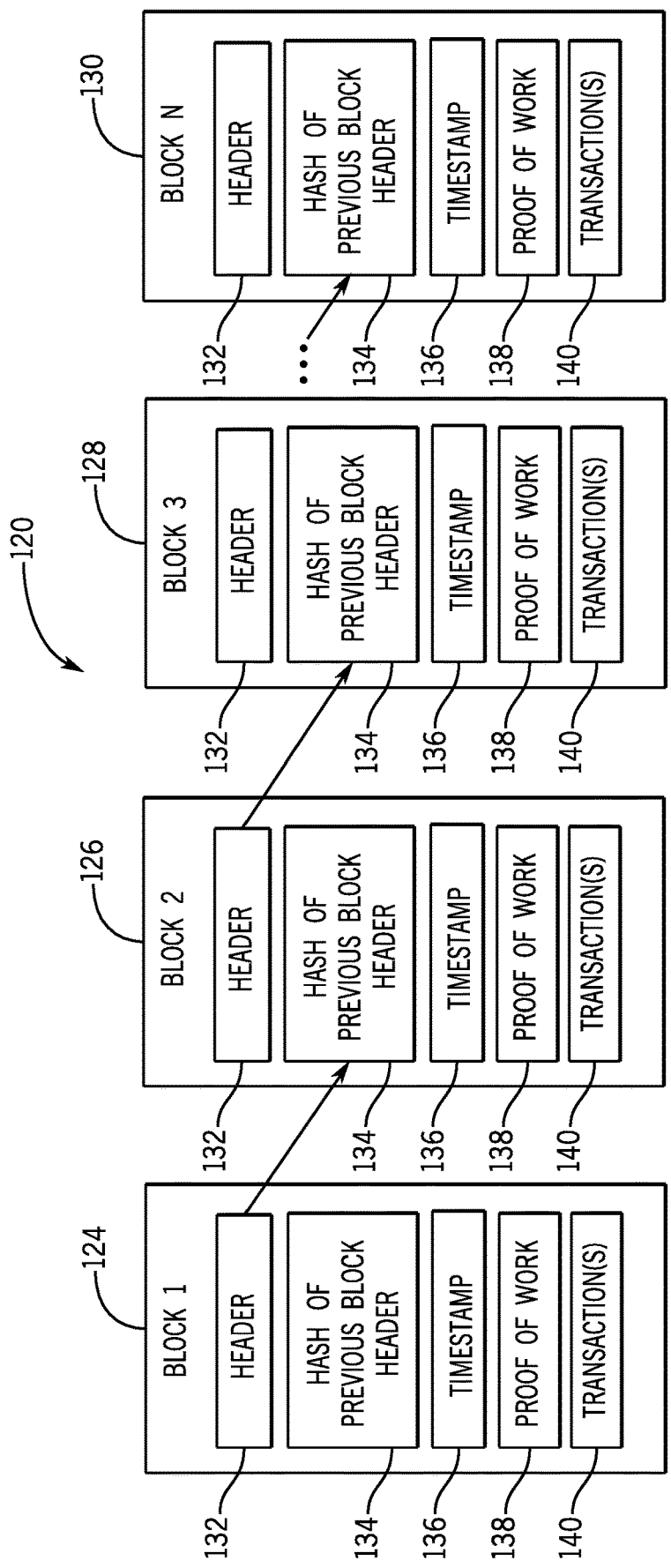
FIG. 2 illustrates a block diagram of a blockchain of the system of FIG. 1, in accordance with embodiments described herein.

FIG. 2 illustrates a block diagram of the blockchain 120 of the system 100 of FIG. 1, in accordance with embodiments described herein. In the illustrated embodiment, the blockchain 120 is illustrated as having multiple blocks 124, 126, 128, and 130. The block 124 (first block in the blockchain 120) may have been created, for example, by the server device(s) 110, and allocated as a special starting block. The block 124 may include a unique header 132 uniquely identifying the block 124 from other blocks in the blockchain 120. Because the block 124 is the first block in the blockchain 120, a hash of a previous block header 134 may be set to zero. A timestamp 136 may include the date of creation for the block 124, and a proof of work section 138 may include certain "work" that proves that a "miner" has performed work suitable for the creation of the block 124 and/or to verify transactions in the blockchain 120. The work section 138 may vary based on a protocol used to create the blockchain 120. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 120, and so on, down the tree. In other words, there is no way to create a fake value that would hash to an expected Merkle tree value (e.g., value stored in work section 138 of the block 124), thus creating a single value that proves the integrity of all of the transactions under it.

Transactions, such as share purchase transactions, share transfers, and so on, may be stored in a transactions section 140. Data related to the particular transaction may also be stored in section 140 (or in another section), including share owner descriptor record(s) 106 and share ownership record(s) 108. The data stored in section 140 may also include shared asset descriptor record(s) 104, such as information about the shared asset (e.g., lot size, square footage, age of building, type of electrical wiring, type of plumbing, lot location, property survey, property appraisal, property inspection, tax payment records, deed, warranty information, insurance information, and so forth). In certain embodiments, a new block may be created when a new shared asset is to be tracked. For example, a new shared asset descriptor record 104 may result in the creation of a new block. In another embodiment, empty blocks may be first created and then assigned, for example via the server device(s) 110, to new shared asset descriptor records 104.

When a new block is created, the block will receive a new header 132 uniquely identifying the new block. As described in greater detail herein, a peer-to-peer network may include multiple "miners" (e.g., computing devices 118, 110) that add blocks to the blockchain 120 based on the blockchain protocol. In general, multiple miners validate transactions 140 that are to be added to a block, and compete (e.g., perform computing work, as introduced above) to have their respective block added to the blockchain 120. Validation of transactions includes verifying digital signatures associated with respective transactions 140. For a block to be added to the blockchain 120, a miner must demonstrate a proof of work before their proposed block of transactions is accepted by the peer-to-peer network, and before the block is added to the blockchain 120. In certain embodiments, a blockchain protocol include a proof of work scheme (e.g., Merkle Trec) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 134) in the blockchain 120, details of the transaction(s) 140 that are to be included in the to-be-created block, and a "nonce" value (e.g., a random number used only once).

Multiple nodes may compete to hash a set of transactions, and to provide the next block that is to be added to the blockchain 120. In certain embodiments, the blockchain protocol may provide a threshold hash to qualify a block to be added to the blockchain 120. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) 140 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 120. Consequently, the respective miner's block is broadcast across the peer-to-peer network (e.g., all user devices 118 communicatively coupled to the system 100). At this point, all other miners cease work (because one miner was already successful), and all copies of the blockchain 120 are updated across the peer-to-peer network to append the block to the blockchain 120. Each miner may produce hundreds of thousands (or more) of hash values, before any one miner provides a qualifying hash value (e.g., at least the first four characters of the hash value are each zero).

It is to be noted that any computing device, such as the user devices 118 and server devices 110, may be miners. Accordingly, as new shared asset descriptor records 104 are created, new blocks may be added to the blockchain 120, including blocks 124, 126, 128, and 130. Indeed, the blockchain 120 may continue to grow, storing shared asset descriptor records 104 and associated share owner descriptor records 106 and share ownership records 108. Because of the distributed nature of the peer-to-peer network created via the distributed ledger 102, each node (e.g., computing devices 118, 110) may include copies of the blockchain 120 and share copies of the blockchain 120 as new peers enter the peer-to-peer network. Each copy of the blockchain 120 may include verified information (e.g., records 104, 106, 108) for all or substantially all of the shared assets tracked by the distributed ledger 102. The information is secure, immutable, and more efficiently tracked as new assets get added via the distributed ledger 102.

Figure 3:
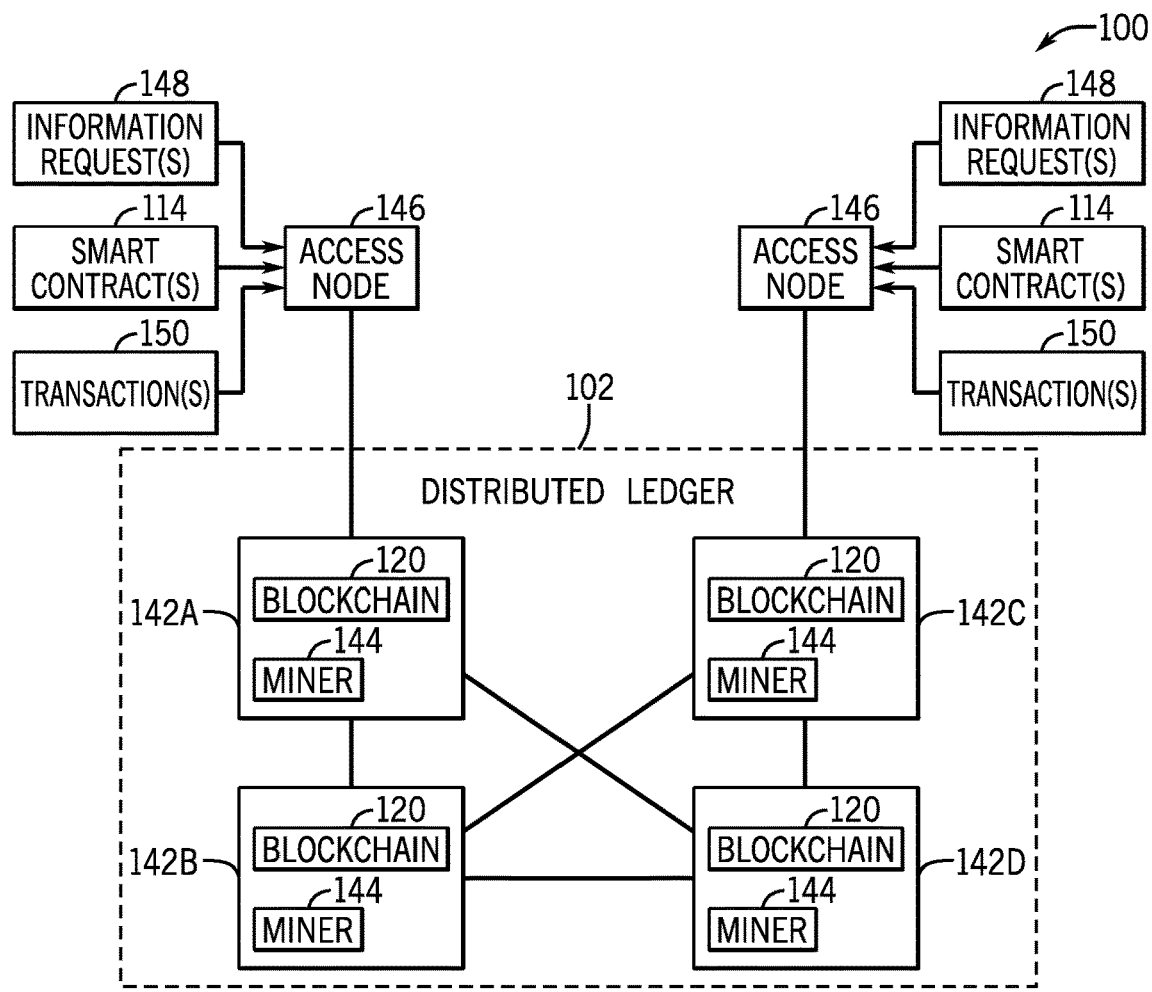
FIG. 3 illustrates a block diagram of the system of FIG. 1, which may be used to track ownership of a shared asset using a distributed ledger (e.g., DLT network), in accordance with embodiments described herein.

FIG. 3 illustrates the system 100 of FIG. 1, which may be used to track ownership of a shared asset using a distributed ledger 102 (e.g., blockchain network), in accordance with embodiments described herein. As described herein, the distributed ledger 102 may be formed by several blockchain nodes, such as blockchain nodes 142A, 142B, 142C, and 142D, which may be implemented by a dedicated server or computer device, or may be implemented as a virtual machine in a shared computing system. Each blockchain node 142A-D may have in its memory a replicate of the blockchain 120. Each blockchain node 142A-D may also have a miner 144, an application that may verify the integrity of the blockchain 120, and may also perform operations and/or transactions using smart contracts 114 associated with the blockchain 120. As described herein, the blockchain 120 is a replicated data structure that may have its consistency and integrity preserved by a consensus mechanism performed by the miners 144.

Users may interact with the distributed ledger 102 via an access node 146. For example, users may request, through the access node 146, the recordation and/or processing of data (e.g., using a smart contract 114), such as an information request 148 (e.g., a request for the state of a smart contract 114), or a transaction request 150 (e.g., a request for a change in a state of the smart contract 114) to the blockchain 120. The smart contracts 114, information requests 148, and/or transaction requests 150 allow users to record history information relating to shared ownership of a shared asset, to obtain information related to the shared asset, and may also be used to record transactions associated with the shared asset, as described herein. Each access node 146 may be implemented by a computer terminal coupled to the distributed ledger 102.

A miner 144 from any of the blockchain nodes 142A, 142B, 142C, and 142D may create an update to the blockchain. In certain embodiments, the smart contract 114 may be a data structure that may include states (e.g., internal states) and transaction instructions relating to the data stored in the blockchain 120. The transactions, or functions, may include instructions that modify the states of the smart contracts 114 and/or interact with other smart contracts 114 by performing further transactions. Examples of smart contracts 114 described herein include smart contracts 114 related to storing the historical information relating to shared ownership of a shared asset, and so forth, as described herein. Following insertion of the smart contract 114, the blockchain node 142 may propagate its update of the blockchain 120, and the other blockchain nodes 142 may accept the update using a consensus mechanism (e.g., proof of work, proof of stake, and so forth). For example, if blockchain node 142A generated a blockchain segment that incorporates some smart contract 114 to the blockchain 120, blockchain node 142A may propagate the updated blockchain 120 to blockchain nodes 142B, 142C, and 142D, which may validate and accept the updated blockchain 120.

Similarly, a transaction request 150 may be received by any miner 144 of the blockchain nodes 142A, 142B, 142C, and 142D via an access node 146. The transaction request 150 may perform operations that cause a change in the state of a smart contract 114 recorded in the blockchain 120. After performing the desired operations, and changing the state of the smart contract 114, in accordance with the transaction request 150, the miner 144 may update the blockchain 120 to record the updated state of the smart contract 114. The updated state of the smart contract 114 may be propagated to the blockchain nodes 142A-D, verified, and persisted using consensus mechanisms. An information request 148, similar to a transaction request 150, may be received by a miner 144, and may perform operations associated with a smart contract 114. However, in contrast with the transaction request 150, the information request 148 does not lead to changes in the state of the smart contract 114 and, thus, updates to the blockchain 120 that result from a successful information request 148 are not performed.

In certain embodiments, performance of the operations by the miners 144 of the blockchain nodes 142 may be incentivized and/or regulated by exchange of tokens (e.g., currencies) of the blockchain 120. For example, in public blockchain s, updates to the blockchain 120 by a blockchain node 142A-D may be rewarded with a blockchain token. Moreover, performance of a transaction request 150 or an information request 148 may be rewarded with a blockchain token. For example, in certain embodiments, in the Ethereum public blockchain, updates to the blockchain from recordation of smart contracts 114 and information requests 148 may be rewarded with Ether tokens, and performance of transaction requests 150 and information requests 148 may be incentivized by offers of Ethers in the form of a secondary token called "gas". In certain private blockchain embodiments, tokens may be used to implement prioritization mechanisms for the operations and/or to prevent large or faulty operations from blocking the blockchain 120 with arbitrarily long operation times.

Figure 4:
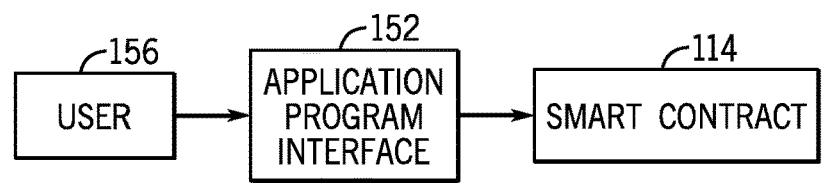
FIG. 4 illustrates an application program interface that may be used to interact with smart contracts, in accordance with embodiments described herein.

The infrastructure described herein may be accessed by an application program interface (API) 152, illustrated in diagram 154 of FIG. 4. In certain embodiments, the API 152 may be accessed from an access node 146. The API 152 may provide users 156 with an interface to the distributed ledger 102. It should be noted that the user 156 may be a human operator accessing a user interface (e.g., interfaces 112, 116) provided by the API 152 or another software performing calls to a computer-accessible interface (e.g., a library) of the API 152. In certain embodiments, the API 152 may be loaded as an interface in an access node 146, or a resource available on the internet that may be accessed using a network application (e.g., a browser) in the access node 146. In certain embodiments, the API 152 may provide tools for creation and interaction with smart contracts 114. For example, the API 152 may convert the state and the functions of a smart contract 114 to binary code for storage and execution by miners 144 of the blockchain 120. In certain embodiments, the API 152 may also convert (e.g., compile) transactions 150 or information requests 148 to a binary message that may be transmitted to the blockchain 120 for execution by miners 144. In certain embodiments, the users 156 may access the smart contracts 114 using the APIs 152, which obey interaction protocols established by the smart contracts 114. Customization of the APIs 152 may allow integration between the system 100 and other internal applications of an organization that wishes to access the system 100.

In certain embodiments, the API 152 may include the option for signing smart contract transactions 150. The signature of the smart contract transaction 150 may include encryption methods using a public/private key infrastructure. For example, a user 156 may have a private key to sign the smart contract transaction 150, which provides proof that the contract was originated by the user 156. Moreover, public/private key infrastructure may also be used to encrypt transactions 150 and prevent unauthorized access. For example, a user 156 may encrypt a transaction parameter using a public key of the smart contract 114 to produce a transaction 150 that can only be readily understood by the smart contract 114. To interact with a smart contract 114, a user 156 may specify a type of smart contract 114, and the API 152 may provide a list of member functions of that particular smart contract 114. The user 156 may, then, choose the member function, and provide inputs or parameters associated with the transaction 150. It should be noted that certain transactions 150 and information requests 148 may require a digital signature for authorization, in certain embodiments. Digital signatures may use the same above-discussed public/private key.

To perform transactions 150, the API 152 may provide an option for the amount of "gas" that a user 156 is willing to use to incentivize performance of the transaction 150, as discussed above. The API 152 may request performance of the transaction 150 to the blockchain 120. The API 152 may receive from the blockchain 120 the results of the transaction 150, which may include an output of the transaction 150, an acknowledgment of execution and/or an indication of failure, when the transaction 150 causes an error, or if the amount of "gas" was insufficient to finalize the operation. It should be understood that the API 152 may provide an interactive user interface (e.g., interface 112, 116) that may be accessed by a human user or an executable library that may be accessed by a computing system. The executable library facilitates access to the system 100 by other applications in the user computation environment.

Figure 5:
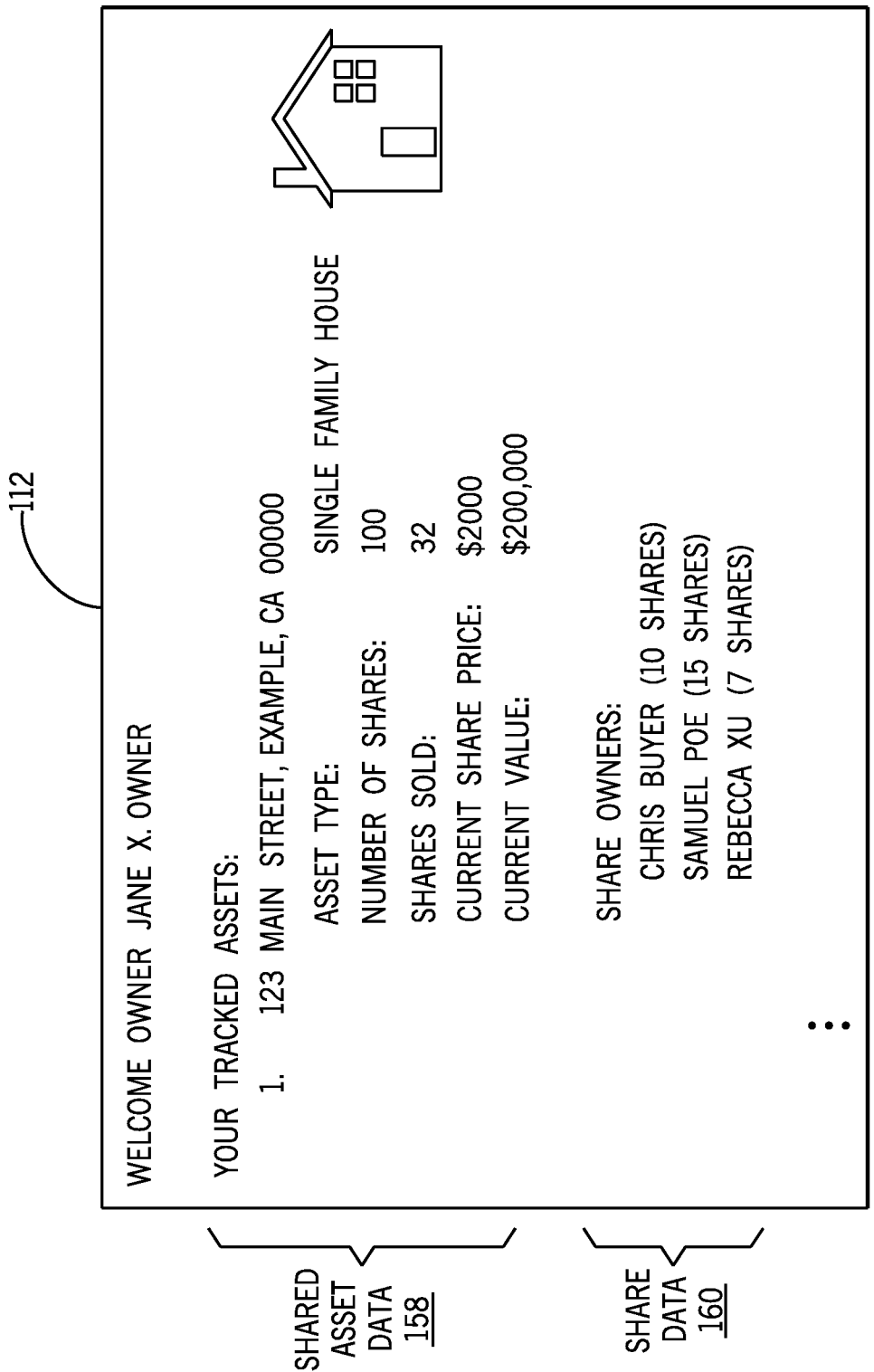
FIG. 5 illustrates a share owner graphical user interface for shared asset ownership tracking, in accordance with embodiments described herein.

FIG. 5 illustrates a share owner interface 112 (e.g., graphical user interface) for shared asset ownership tracking, in accordance with embodiments described herein. As illustrated, in certain embodiments, the share owner interface 112 may present shared asset data 158 regarding a shared asset, such as the location (e.g., address), asset type, total number of shares in the shared asset, number of shares sold, current share price, and/or current value of the shared asset. In certain embodiments the shared asset data 158 may also include other information, such as one or more images of the shared asset, information regarding encumbrances on the shared asset, tax information, share buying and selling activity, and so forth. In certain embodiments, the share owner interface 112 may also present share data 160, including a list of share owners that have purchased shares, the number of shares held by each share owner, and/or other information. In certain embodiments, a share owner may log into the share owner interface 112 using access credentials, such as a username, password, and so forth. In certain embodiments, the share owner interface 112 may list shared asset data 158 and/or share data 160 for any number of shared assets that are owned by the particular share owner that is logged into the share owner interface 112.

In certain embodiments, the share owner interface 112 may be displayable by computer code or instructions (e.g., application) executable via the user devices 118 and/or server devices 110. More specifically, the share owner interface 112 may be presented as a GUI screen on the user devices 118 and/or server devices 110. In certain embodiments, the share owner interface 112 may query the blockchain 120, which may have a local copy stored in the computing device 118, 110 that is currently displaying the share owner interface 112. The query may then return the displayed shared asset data 158 and share data 160 based on querying the blocks in the blockchain 120 for shared asset descriptor records 104 that have a certain owner ID, such as an owner ID associated with the displayed name "Jane X. Owner." The user 156 may then view the displayed data 158, 160. If a user 156 desires to purchase shares in a shared asset, the user 156 may use the share purchaser interface 116, as illustrated in FIG. 6.

FIG. 6 illustrates a share purchaser interface 116 for asset share purchase, in accordance with embodiments described herein. As illustrated, in certain embodiments, the share purchaser interface 116 may list, for a particular share purchaser (e.g., "Chris Buyer"), purchased asset data 162 describing the various asset shares held (previously purchased) by the logged in share owners. For example, in certain embodiments, the purchased asset data 162 may list, for one or more shared assets, the number of shares in that particular shared asset held by the user 156, information regarding the shared asset, a current share price for the shared asset, and so forth. In certain embodiments, the purchased asset data 162 may also indicate, for the user 156, the total current value of the user's portfolio of asset shares, such as a sum of the total share value for each shared asset in which the user 156 holds shares. In certain embodiments, the share purchaser interface 116 may also present available asset data 164, listing various shared assets for which shares are available for purchase. For example, in certain embodiments, for each available shared asset, the available asset data 164 may describe the shared asset (e.g., location and/or asset type), the current share price, the number of shares available, and so forth. In certain embodiments, the share purchaser interface 116 may also present trend information describing how the share price for one or more shared assets has changed over time.

In certain embodiments, the share purchaser interface 116 may be displayable by computer code or instructions (e.g., application) executable via the user devices 118 and/or server devices 110. More specifically the share purchaser interface 116 may be presented as a GUI screen on the user devices 118 and/or server devices 110. In certain embodiments, the share owner interface 112 may query the blockchain 120, which may have a local copy stored in the computing device 118, 110 that is currently displaying the share purchaser interface 116. The query may then return the displayed purchased asset data 162 and the available asset data 164 based on querying the blocks in the blockchain 120 for shared asset descriptor records 104 that have a certain purchaser ID, such as a purchaser ID associated with the displayed purchaser name "Chris Buyer." The user 156 may then view the displayed data 162, 164.

As will be appreciated, in certain embodiments, a user 156 wanting to purchase shares in one of the available shared assets having available asset data 164 displayed via a share purchaser interface 116 may select the particular shared asset via the share purchaser interface 116 (and, for example, enter a number of shares the user 156 wishes to purchase), thereby initializing a purchase of shares in the shared asset. In certain embodiments, in response to this initialization of a purchase of shares in the shared asset, a share owner may be notified of the proposed purchase of the shares in the shared asset via a share owner interface 112, and the share owner may approve, disapprove, or modify (e.g., decrease the proposed number of shares of) the proposed purchase via the share owner interface 112. In addition, in certain embodiments, in response to the approval, disapproval, or modification of the proposed purchase of the shares in the shared asset, the user 156 wishing to purchase the shares in the shared asset may be notified of the approval, disapproval, or modification of the proposed purchase via a share purchaser interface 116. Indeed, in certain embodiments, each of the notifications described herein may automatically launch and activate an application on a user device 118 and/or a server device 110 associated with the party being notified. For example, in response to a user 156 initializing a purchase of shares in a shared asset, a signal may be transmitted from a user device 118 or a server device 110 associated with the prospective purchaser to a user device 118 and/or a server device 110 associated with the share owner such that the share owner may be relatively instantaneously (e.g., in as short amount of time as the signal may be transmitted via a communication network) notified of the proposed purchase of shares of the shared asset. In certain embodiments, the automatic notifications may be accomplished via a dedicated communication channel of the communication network to, for example, ensure the authenticity of the automatic notifications.

Figure 7:
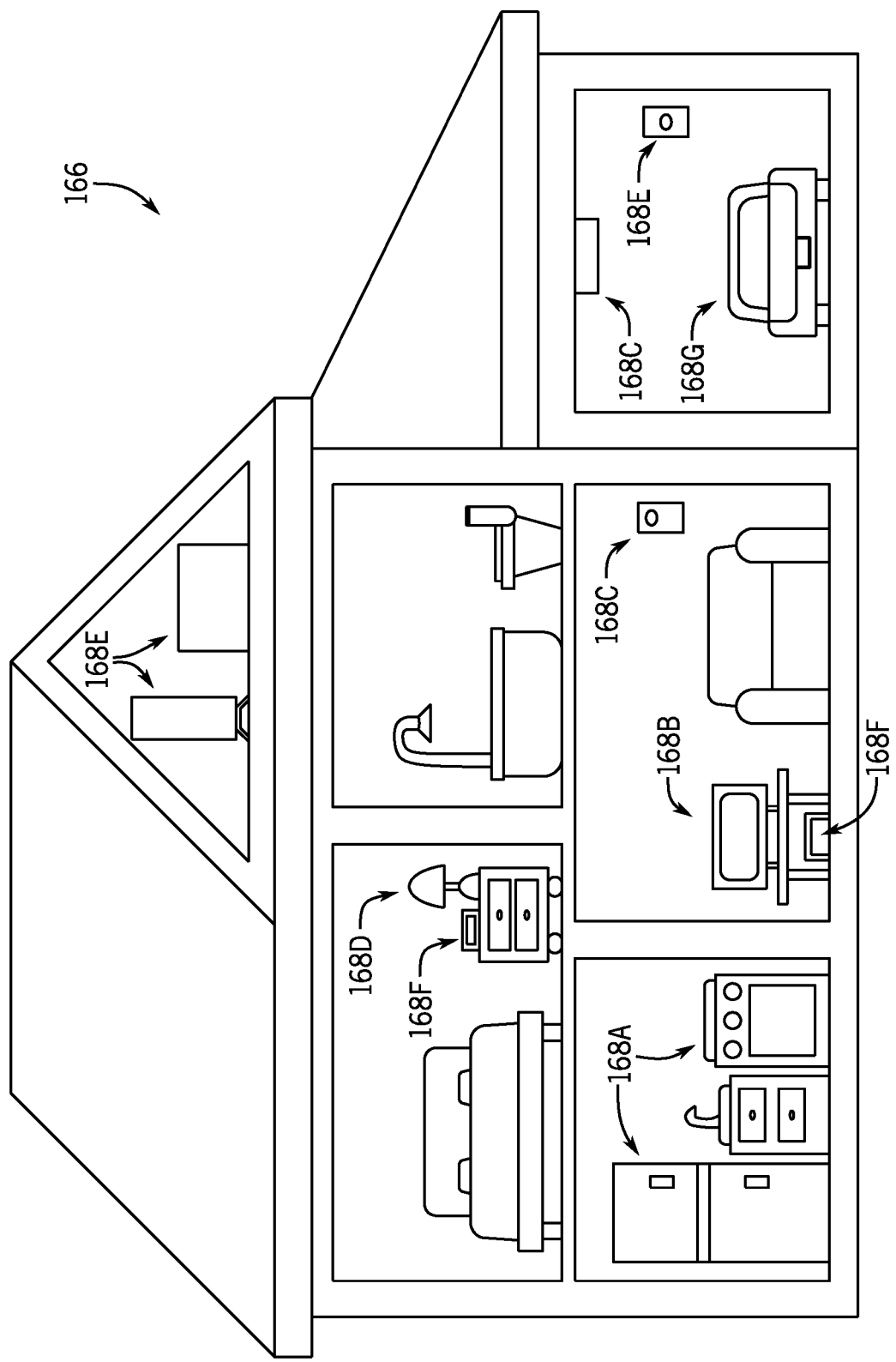
FIG. 7 illustrates a shared asset having a plurality of smart devices, control of which may be transferred using the system of FIG. 1, in accordance with embodiments described herein.

As described in greater detail herein, in certain embodiments, the system 100 may enable transfer of control of one or more smart devices associated with the shared asset from a first share owner to a second share owner, for example, when custody of the shared asset is transferred, as tracked by the system 100. For example, FIG. 7 illustrates a shared asset 166 having a plurality of smart devices 168, control of which may be transferred from a first share owner to a second share owner using the system 100 of FIG. 1, in accordance with embodiments described herein. In certain embodiments, the smart devices 168 may include, but are not limited to, one or more of the following:

- smart appliances 168A, such as washers, dryers, refrigerators, ovens, dishwashers, and so forth;
- home entertainment systems 168B, such as televisions, audio systems, game consoles, media players, and so forth;
- in-home control systems 168C, such as garage door openers, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);
- lighting devices 168D, such as lamps, fixtures, and so forth;
- utility systems 168E that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth;
- portable or less portable computing devices 168F, such as smartphones, tablet computers, electronic book readers, laptop computers, desktop computers, television set-top boxes, in-vehicle automotive computers or telematics devices, and so forth; and/or
- smart vehicles 168G.

In certain embodiments, when custody of the shared asset is transferred from a first share owner to a second share owner, a signal may be automatically transmitted (e.g., from a user device 118 and/or a server device 110) to one or more of the smart devices 168 to activate access authorization from the first share owner to the second share owner. For example, in certain embodiments, in response to a transfer of custody, the signal automatically transmitted to the smart devices 168 may be used by the smart devices 168 to automatically update user authentication information (e.g., username/password combinations, as well as acceptable biometric data such as acceptable fingerprint data, acceptable retinal data, acceptable voice recognition data, and so forth, which may be accepted by biometric sensors of the smart devices 168, and so forth) from the first share owner to the second share owner. In certain embodiments, the automatic transmission of the signal to update the access authorization of the smart devices 168 may be accomplished via a dedicated communication channel of a communication network to, for example, ensure the authenticity of the signal.

Figure 8:
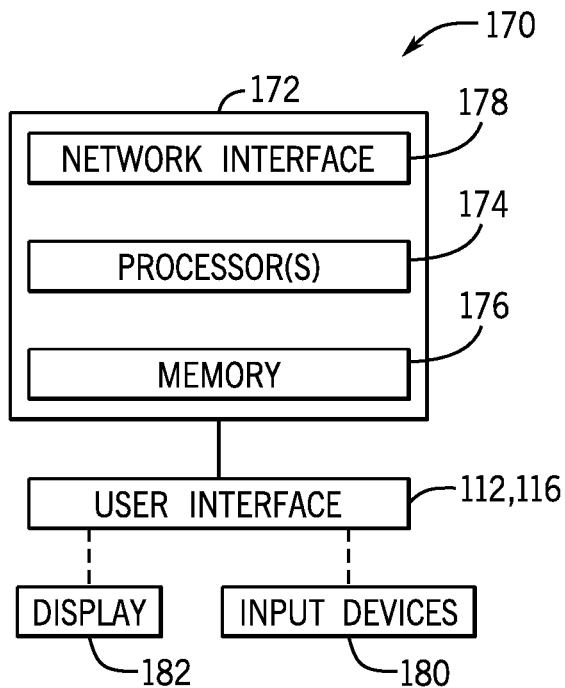
FIG. 8 illustrates a computing device, in accordance with embodiments described herein.

FIG. 8 illustrates a computing device 170 that may be used to implement devices such as the server device(s) 110, the user device(s) 118, the DLT nodes 142A, 142B, 142C, and 142D, and the access nodes 146, for example, in accordance with embodiments described herein. The computing device 170 may include a processing unit 172, which may include one or more processors 174 and one or more memories 176. In certain embodiments, the one or more processors 174 may refer to a single application specific integrated circuit (ASIC), to multiple ASICs, or to soft processing circuitry implemented in programmable logic devices, such as FPGAs and PLDs. In certain embodiments, the one or more processors 174 may implement universal processing architectures, such as a complex instruction set computer (CISC) architecture or a reduced instruction set computer (RISC) architecture. In certain embodiments, the one or more processors 174 may implement specialized processing architectures that may include instructions that include, but are not limited to, the computing operations described herein.

In certain embodiments, the one or more memories 176 may include volatile memory for performance of operations (e.g., random access memory (RAM)) and/or persistent memory for long-term storage (e.g., hard disks, solid-state devices). Long-term storage may be optimized for durability and/or access speed times by resorting to configurations such as a redundant array of independent disks (RAID) device. In certain embodiments, a network interface 178 may include Ethernet-based connections, including copper wire network connections, backplane connections, and/or wireless (e.g., WiFi) network connections. The network interface 178 may also be implemented using other communication standards including, but not limited to, peripheral component interface express (PCIe) connections, Bluetooth connections, universal serial bus (USB) connections, and any other method for transmission of information between the computing devices described herein. In certain embodiments, the network interface 178 may also facilitate integration between the API 152 and other computation resources of an organization (e.g., accounting management applications). In certain embodiments, the computing device 170 may also include input devices 180 and display devices 182. Examples of input devices 180 include keyboards, touchscreen, mouse, touchpads, track point, and other pointing devices. Examples of display devices 182 include computer monitors, console terminals, and printers.

As described in greater detail herein, in certain embodiments, the one or more memories 176 store instructions that, when executed by the one or more processors 174, cause the one or more processors 174 to perform operations that include, among other things, receiving a request (e.g., from a user 156 via a user device 118) to update a first set of data relating to a shared asset (e.g., a timeshared asset) stored in a DLT network (e.g., the distributed ledger 102), accessing the DLT network (e.g., the distributed ledger 102) to update the first set of data relating to the shared asset in accordance with the received request and, upon updating the first set of data relating to the shared asset, providing a second set of data relating to the shared asset.

As described in greater detail herein, in certain embodiments, the first set of data relating to the shared asset may include a description of the shared asset (e.g., location and/or asset type), a current share price for shares of the shared asset that are available to be purchased, the number of shares available to be purchased for the shared asset, and so forth, as described in greater detail herein. In certain embodiments, the second set of data relating to the shared asset may include a proposed purchase of a subset of the shares of the shared asset that are available, as described in greater detail herein. In certain embodiments, the update of the first set of data relating to the shared asset may include initialization of the proposed purchase.

However, as also described in greater detail herein, in other embodiments, the first set of data relating to the shared asset may include a number of shares of the shared asset owned by a particular share owner, a percentage of shared ownership of the shared asset for a particular owner, a time apportionment of shared ownership of the shared asset for a particular owner, a transfer of custody of the shared asset between two share owners, and so forth. In certain embodiments, the second set of data relating to the shared asset may include a transfer of control of one or more smart devices of the shared asset between two share owners. In certain embodiments, the update of the first set of data relating to the shared asset may include a transfer of custody of the shared asset between two share owners. Indeed, in yet other embodiments, both the first and second sets of data relating to the shared asset may include any and all of the data that is tracked by the system 100 (e.g., stored in a DLT network (e.g., the distributed ledger 102, including the one or more blockchains 120) described herein, and the update of the first set of data may include any and all of the data interactions described herein.

Figure 9:
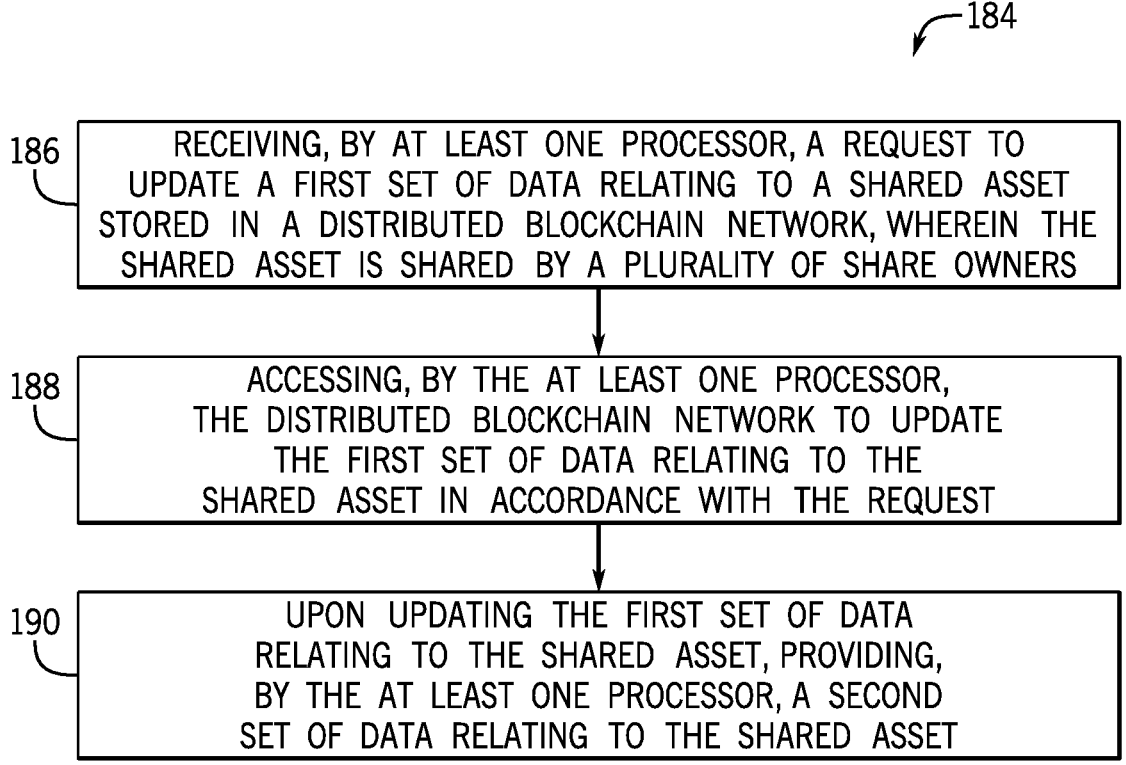
FIG. 9 illustrates a flow diagram of a method of operation of the system of FIG. 1, in accordance with embodiments described herein.

Accordingly, FIG. 9 illustrates a flow diagram of a method 184 of operation of the system 100 of FIG. 1, in accordance with embodiments described herein. In certain embodiments, the method 184 includes receiving, by one or more processors 174, a request (e.g., from a user 156 via a user device 118) to update the first set of data relating to a shared asset stored in a DLT network (e.g., the distributed ledger 102), wherein the shared asset is shared by a plurality of share owners (block 186). In addition, in certain embodiments, the method 184 includes accessing, by the one or more processors 174, the DLT network (e.g., the distributed ledger 102) to update the first set of data relating to the shared asset in accordance with the request (block 188). In addition, in certain embodiments, the method 184 includes providing, by the one or more processors 174, the second set of data relating to the shared asset upon updating the first set of data relating to the shared asset (block 190).

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A system comprising:
at least one processor; and
at least one non-transitory computer-readable storage media communicatively coupled to the at least one processor, the at least one non-transitory computer-readable storage media storing instructions which, when executed by the at least one processor, cause the at least one processor to perform operations comprising:
receiving a request to update data relating to a shared asset stored in a distributed ledger technology (DLT) network, wherein the shared asset is shared by a plurality of share owners;
accessing the DLT network to update the data relating to the shared asset stored on the DLT network in accordance with the request; and
upon updating the data relating to the shared asset that is stored on the DLT network, automatically transmitting a control signal to one or more smart devices associated with the shared asset, to transfer custody of the one or more smart devices from a first share owner of the plurality of share owners to a second share owner of the plurality of share owners by automatically updating authentication information stored in the one or more smart devices from the first share owner to the second share owner in accordance with the updated data relating to the shared asset stored on the DLT network, wherein the authentication information comprises biometric data of the second share owner to be verified by one or more biometric sensors associated with the shared asset.

2. The system of claim 1, wherein the data comprises a number of ownership shares of the shared asset owned by at least one share owner of the plurality of share owners.

3. The system of claim 1, wherein the data comprises a percentage of shared ownership of the shared asset for at least one share owner of the plurality of share owners.

4. The system of claim 1, wherein the data comprises a time apportionment of shared ownership of the shared asset for at least one share owner of the plurality of share owners.

5. The system of claim 1, wherein the data comprises a previous transfer of custody of the shared asset between the plurality of share owners.

6. The system of claim 1, wherein the one or more smart devices comprise one or more smart appliances, one or more home entertainment systems, one or more in-home control systems, one or more lighting devices, one or more utility systems, one or more smart vehicles, or some combination thereof.

7. A method performed by at least one processor, the method comprising:
receiving, by the at least one processor, a request to update data relating to a shared asset stored in a distributed ledger technology (DLT) network, wherein the shared asset is shared by a plurality of share owners;
accessing, by the at least one processor, the DLT network to update the data relating to the shared asset stored on the DLT network in accordance with the request; and
upon updating the data relating to the shared asset that is stored on the DLT network, automatically transmitting, by the at least one processor, a control signal to one or more smart devices associated with the shared asset, to transfer custody of the one or more smart devices from a first share owner of the plurality of share owners to a second share owner of the plurality of share owners by automatically updating authentication information stored in the one or more smart devices from the first share owner to the second share owner in accordance with the updated data relating to the shared asset stored on the DLT network, wherein the authentication information comprises biometric data of the second share owner to be verified by one or more biometric sensors associated with the shared asset.

8. The method of claim 7, wherein the data comprises a number of ownership shares of the shared asset owned by at least one share owner of the plurality of share owners.

9. The method of claim 7, wherein the data comprises a percentage of shared ownership of the shared asset for at least one share owner of the plurality of share owners.

10. The method of claim 7, wherein the data comprises a time apportionment of shared ownership of the shared asset for at least one share owner of the plurality of share owners.

11. The method of claim 7, wherein the data comprises a previous transfer of custody of the shared asset between the plurality of share owners.

12. The method of claim 7, wherein the one or more smart devices comprise one or more smart appliances, one or more home entertainment systems, one or more in-home control systems, one or more lighting devices, one or more utility systems, one or more smart vehicles, or some combination thereof.

13. One or more non-transitory computer-readable storage media storing instructions which, when executed by at least one processor, cause the at least one processor to perform operations comprising:
 receiving a request to update data relating to a shared asset stored in a distributed ledger technology (DLT) network, wherein the shared asset is shared by a plurality of share owners;
 accessing the DLT network to update the data relating to the shared asset stored on the DLT network in accordance with the request; and
 upon updating the data relating to the shared asset that is stored on the DLT network, automatically transmitting a control signal to one or more smart devices associated with the shared asset, to transfer custody of the one or more smart devices from a first share owner of the plurality of share owners to a second share owner of the plurality of share owners by automatically updating authentication information stored in the one or more smart devices from the first share owner to the second share owner in accordance with the updated data relating to the shared asset stored on the DLT network, wherein the authentication information comprises biometric data of the second share owner to be verified by one or more biometric sensors associated with the shared asset.

14. The one or more non-transitory computer-readable storage media of claim 13, wherein the data comprises a number of ownership shares of the shared asset owned by at least one share owner of the plurality of share owners.

15. The one or more non-transitory computer-readable storage media of claim 13, wherein the data comprises a percentage of shared ownership of the shared asset for at least one share owner of the plurality of share owners.

16. The one or more non-transitory computer-readable storage media of claim 13, wherein the data comprises a time apportionment of shared ownership of the shared asset for at least one share owner of the plurality of share owners.

17. The one or more non-transitory computer-readable storage media of claim 13, wherein the data comprises a previous transfer of custody of the shared asset between the plurality of share owners.

* * * * *